United States Patent
Gravio

(10) Patent No.: US 8,210,980 B2
(45) Date of Patent: Jul. 3, 2012

(54) ORBITAL MAGNETIC SPEED CHANGE

(76) Inventor: Valmor Da Cunha Gravio, Pompeia (BR)

( * ) Notice: Subject to any disclaimer, the term of this patent is extended or adjusted under 35 U.S.C. 154(b) by 310 days.

(21) Appl. No.: 12/690,219

(22) Filed: Jan. 20, 2010

(65) Prior Publication Data

US 2010/0237731 A1    Sep. 23, 2010

(51) Int. Cl.
*F16H 48/06* (2006.01)
(52) U.S. Cl. ........................ 475/149; 310/103
(58) Field of Classification Search .................. 475/149, 475/150, 162, 169, 181; 310/103
See application file for complete search history.

(56) References Cited

U.S. PATENT DOCUMENTS

| | | | | |
|---|---|---|---|---|
| 1,359,616 A * | 11/1920 | Murray | ........................ | 475/149 |
| 3,587,015 A * | 6/1971 | Mitchell | ........................ | 310/103 |
| 6,054,788 A * | 4/2000 | Dombrovski et al. | ........ | 310/103 |
| 6,200,426 B1 * | 3/2001 | Graf | ........................ | 310/103 |
| 6,217,298 B1 * | 4/2001 | Klaui | ........................ | 310/103 |
| 2005/0258692 A1 * | 11/2005 | Wise | ........................ | 310/103 |
| 2006/0119201 A1 * | 6/2006 | Nissen | ........................ | 310/103 |
| 2007/0284956 A1 * | 12/2007 | Petrovich et al. | ........... | 310/103 |
| 2011/0127869 A1 * | 6/2011 | Atallah et al. | ............... | 310/103 |
| 2011/0266902 A1 * | 11/2011 | Whitfield et al. | ............ | 310/103 |

* cited by examiner

*Primary Examiner* — David D Le
*Assistant Examiner* — Derek D Knight

(57) ABSTRACT

The present invention refers to a speed change mechanism with magnetic torque transmission using two stages of epicyclic transmission, with four bases, containing each base at least one magnetic poles ring, the first stage has one base with orbital motion and one base reciprocal to the housing concentric with the two shafts, the second stage has one base with rotational motion concentric with the lower rotation shaft and one base with orbital motion reciprocal to the orbital motion base of the first stage, the torque transmission of each stage is done by the magnetic poles rings of each base, and the transmission ratio change is done by changing the pair of magnetic poles rings that are transmitting torque.

7 Claims, 10 Drawing Sheets

ORBITAL MAGNETIC SPEED CHANGE

FIELD OF THE INVENTION

The present invention relates to a speed change mechanism using two epicyclic transmission stages with the torque transmission done between two magnetic poles rings of each stage and the transmission ratio change is done by changing the pairs of magnetic poles rings that are transmitting torque.

BACKGROUND OF THE INVENTION

This invention is an evolution of my Brazilian patent application PI 0804261-6 "Redutor de Velocidade Magnético Orbital", that is a magnetic speed reducer with one single transmission ratio. In my patent application PI 0804261-6 "Redutor de Velocidade Magnético Orbital" each stage of reduction has one pair of magnetic poles rings and the speed reducer has a single transmission ratio, now in this invention, we have a speed change mechanism with more than one transmission ratio and for this we have more pairs of magnetic poles rings, working one pair or another, or working each pair alternately or pairs of magnetic poles rings with variation in the number of poles. There are known magnetic variable speed drives where increasing the transmission ratio do not increase the output torque and have low efficiency in many operating points. The speed changer mechanism using gears are widely used, but they have acoustic noise and do not have high efficiency.

DESCRIPTION OF THE PRIOR ART

FIG. 1 shows the magnetic speed reducer from FIG. 6 of my Brazilian patent application PI 0804261-6, which is the basis for this invention and where can be seen the working principle of this kind of orbital magnetic speed change. In FIG. 1 the magnetic poles ring (4A) is reciprocal to the orbital base (3A) and is magnetically coupled to the magnetic poles ring (6A) reciprocal to the fixed base (5A), defining the pair of magnetic poles rings of the first transmission stage. The second transmission stage is formed by the magnetic poles ring (4B) coupled to the magnetic poles ring (6B). The magnetic poles ring (4B) is reciprocal to the orbital base (3B) that is reciprocal to the orbital base (3A). The magnetic poles ring (6B) is reciprocal to the rotational base (5B). The magnetic poles rings (4A), (4B), (6A) and (6B) are formed by permanent magnets with radial and alternate adjacent poles magnetization. The fixed base (5A) forms a single piece with the flange (17). The base (5B) rotates on bearings (11), which bearings (11) are supported in the housing (16) and the lower rotation shaft (14) is part of the base (5B). The magnetic pole ring (4A) has different number of poles of the magnetic pole ring (4B) and as the poles has the same size, to maintain the same eccentricity in the two reducing stages, the magnetic poles rings (4A) and (6A) must have the same difference in the number of poles of the magnetic poles rings (4B) and (6B). The rotation of the higher rotation shaft (1) with the eccentric cam (2), which is reciprocal, move in orbital motion the orbital base (3A) and the orbital base (3B) through the bearing (10). The magnetic poles ring (4A) with orbital motion and magnetically coupled to the magnetic poles ring (6A) has also rotary motion and transmits torque to the magnetic poles rings (4B) due to be reciprocal to it. The magnetic poles ring (4B) with rotational and orbital motion transmits torque to the magnetic poles ring (6B), rotating it. In this example in FIG. 1 the eccentric cam (2) is reciprocal to the counterweights (18A) and (18B) to minimize the unbalance forces generated by the orbital motion and thus avoid further vibrations that are usually undesirable. The rotation of the lower rotation shaft (14) in relation of the higher rotation shaft (1) is equal the difference between the products of the number of poles in the magnetic poles ring (6B) by the number of poles in the magnetic poles ring (4A) and product of the number of poles of the magnetic poles ring (4B) by the number of poles in the magnetic poles ring (6A) divided by the product of the number of poles of the magnetic poles ring (6B) by the number of poles in the magnetic poles ring (4A). A negative result means the opposite direction of rotation.

SUMMARY OF THE INVENTION

As an option for these problems the present invention uses two stages of epicyclic transmission, as in the prior art. The difference from prior art is the use of more pairs of magnetic poles rings in each transmission stage for torque transmission, working one pair or another, or working each pair alternately or working pairs of magnetic poles rings with variation in the number of poles and than to change the transmission ratio is necessary to change the pair of magnetic poles rings transmitting torque. To form the magnetic poles rings can be employed permanent magnets, electromagnets, salient poles of soft magnetic material, etc. Some advantages of this orbital magnetic speed change mechanism are the possibility of reaching large transmission ratios, high efficiency, great torque transfer, very compact drives and simple construction.

To facilitate the understanding of the new technique several embodiments are described in greater detail below, with reference to the drawings.

DESCRIPTION OF THE PREFERRED EMBODIMENTS

Figure 1:
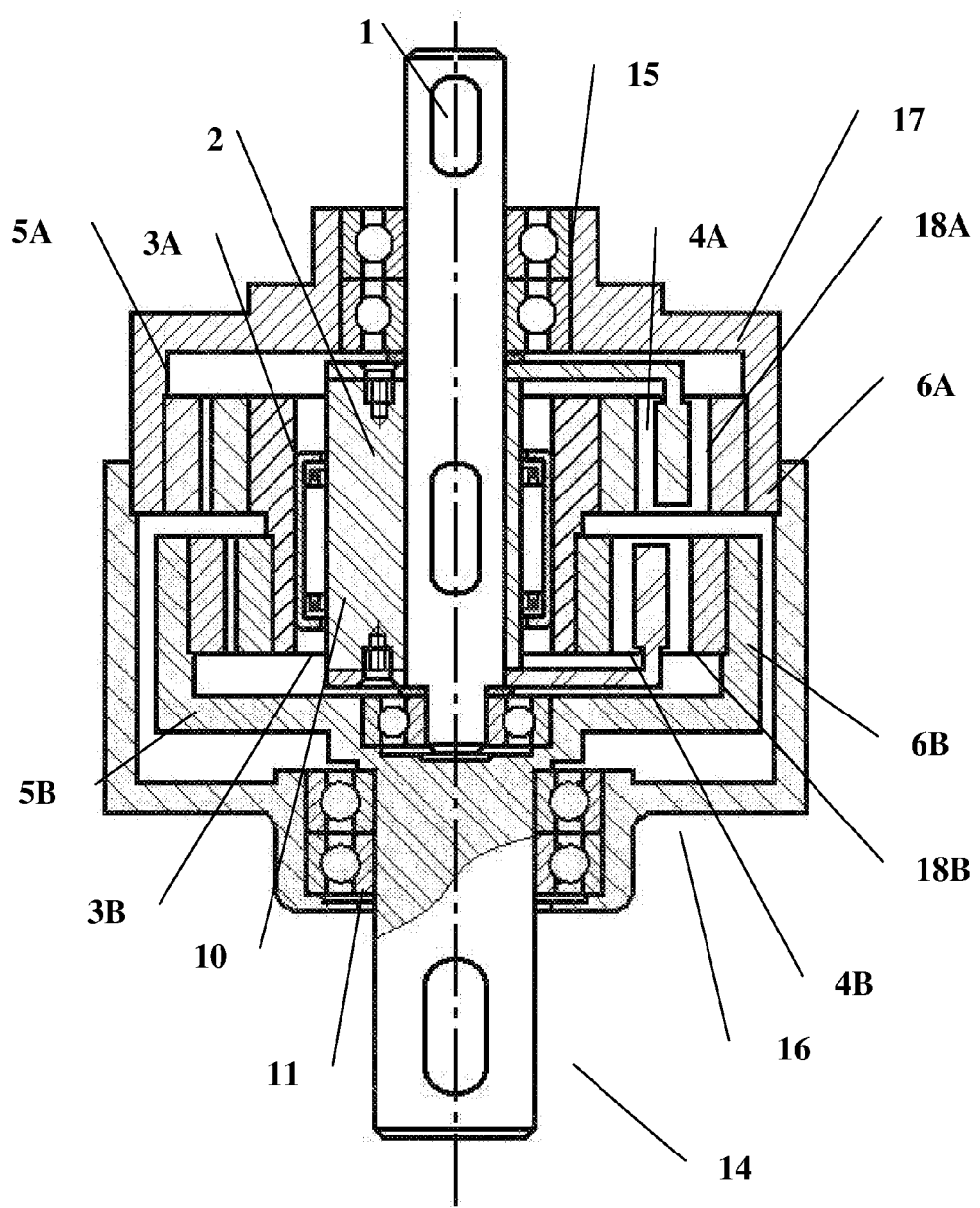
FIG. 1 presents a longitudinal section view of a double-stage magnet transmission reducer of the prior art.
Figure 2A:
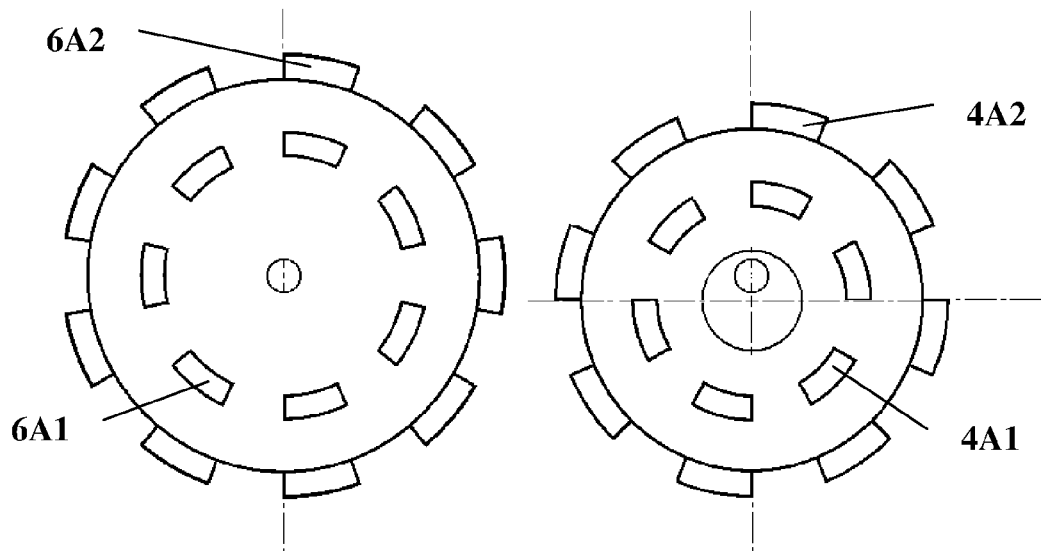
FIG. 2A presents a front view in schematic representation of two flanges, where each flange has two magnetic poles rings of salient poles and one of the flanges rotate in an eccentric cam.

FIG. 2A shows a front view in schematic representation of two flanges, one flange which has two concentric axial magnetic poles rings (6A1) and (6A2) and one flange with orbital motion that has two concentric axial magnetic poles rings (4A1) and (4A2).

Figure 2B:
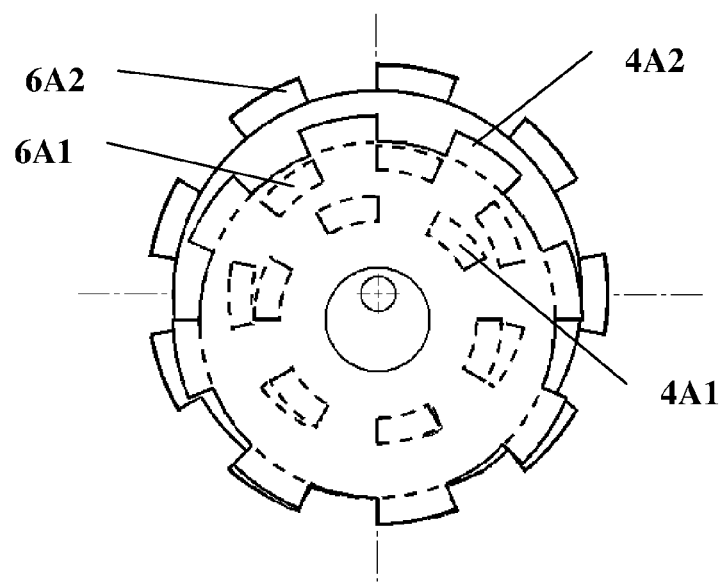
FIG. 2B presents a front view in schematic representation of the two flanges of FIG. 2A, mounted with their respective magnetic poles ring of salient poles facing each other in parallel position.

FIG. 2B shows a front view in schematic representation of the two flanges of FIG. 2A, assembled with their respective salient poles facing each other in parallel position, where the salient magnetic poles rings (6A1) with (4A1) and (6A2) with (4A2) have some poles with axial alignment.

Figure 3:
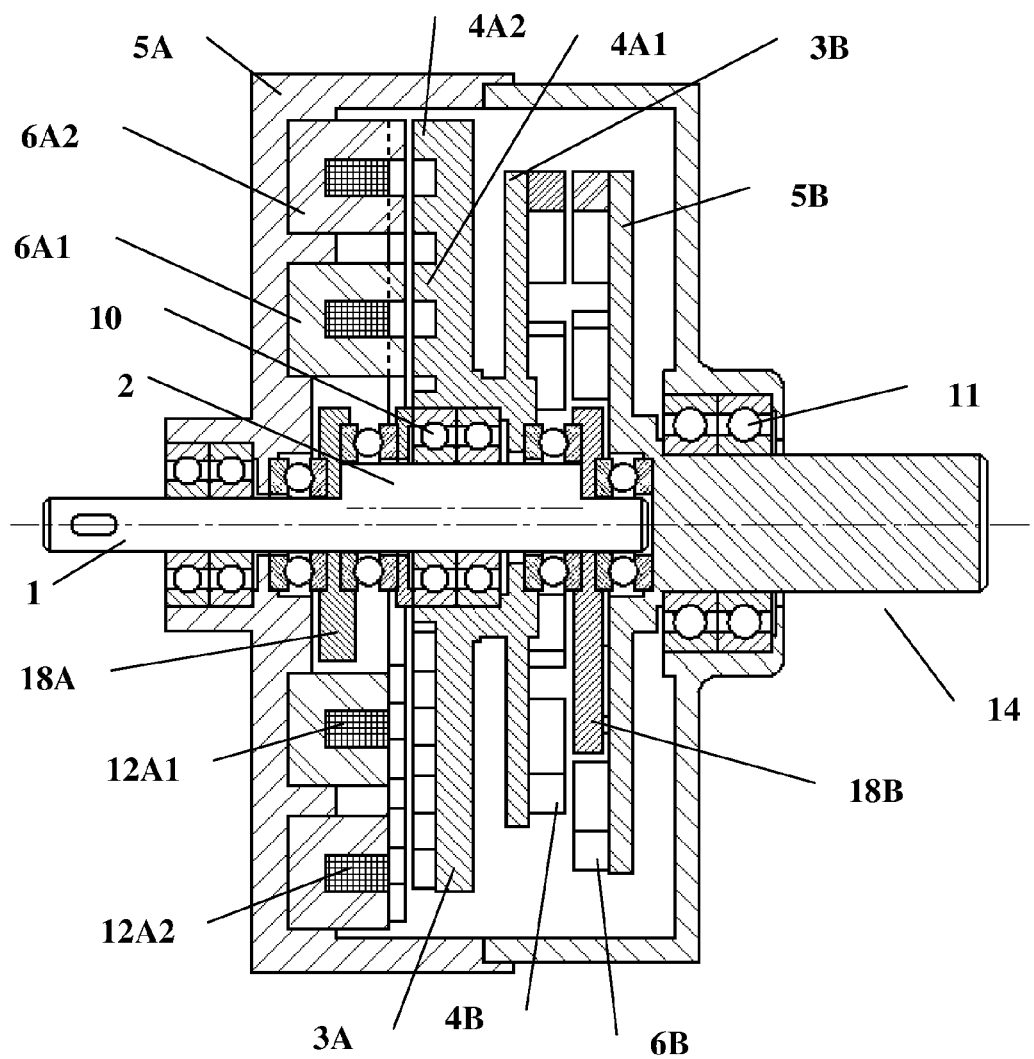
FIG. 3 presents a longitudinal section view of an orbital magnetic speed change mechanism with the first stage containing two pairs of magnetic poles ring of salient poles as on the model of FIG. 2B, the magnetization of each magnetic poles ring is done by energizing of its coil and the second stage contains just a pair of magnetic poles ring formed by permanent magnets where the poles are salient and axial.

In FIG. 3 we have a longitudinal section view of an orbital magnetic speed change with all the magnetic poles rings with salient and axial poles, as in the example of FIG. 2A and FIG. 2B. The magnetic poles rings (6A1) and (6A2) are reciprocal to the fixed base (5A) and are electromagnets rings with two rows of multiple salient poles, with the rows of poles with reverse magnetization and the poles of each row being equal and equidistant.

The energizing of the coil (12A1) generates a magnetic flux in the magnetic poles ring (6A1), producing the magnetic forces of attraction between the nearest poles of the magnetic poles rings (6A1) and (4A1). Each of the magnetic poles rings (4A1) and (4A2) has two rows of multiple poles, and the poles of each row been axial, equidistant and with the same size of their respective poles of the other base and are made of soft magnetic material and will close the magnetic circuit generated in the magnetic poles rings (6A1) and (6A2). Likewise, the energizing of the coil (12A2) generates a magnetic flux in the magnetic poles ring (6A2), producing the magnetic forces of attraction between the nearest poles of the magnetic poles rings (6A2) and (4A2). These magnetic poles rings (4A1), (6A1), (4A2) and (6A2) belong to the first transmission stage of the orbital magnetic speed change. The second transmission stage is done by the magnetic coupling between permanent magnets that form the magnetic poles rings (6B) and (4B). The lower rotation shaft (14), in this example, is part of the rotational base (5B). The rotation of the higher rotation shaft (1) rotates the eccentric cam (2) which is reciprocal, and energizing the coil (12A1) or (12A2) or both alternately are magnetized its respective magnetic poles rings (6A1) or (6A2), magnetic coupling it to its respective magnetic poles ring (4A1) or (4A2) and thereby transferring movement to the magnetic poles ring (4B) which transmits torque to the magnetic poles ring (6B) moving the lower rotation shaft (14). Thus the energizing of the coil (12A1) or (12A2) defines the different transmission ratio of the orbital magnetic speed change, as the transmission ratio of the second transmission stage is fixed.

Figure 4:
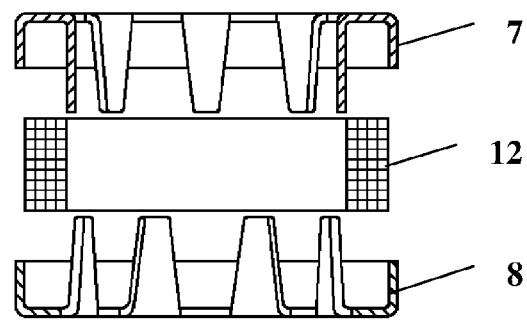
FIG. 4 presents a cross-sectional view of a schematic representation of one model of magnetic poles ring.

FIG. 4 is an example of the magnetic poles rings formed by the axial junction of two multi-poles parts of soft magnetic material (7) and (8) around a coil (12) forming a magnetic poles rings with adjacent poles with alternating magnetic polarity when energizing the coil (12). This example results in an internal radial magnetic poles ring, but it could be external radial magnetic poles ring if the multi-poles of the parts (7) and (8) were external and it is also possible to construct another magnetic poles ring with the multi-poles of the parts (7) and (8) been radial and thus form an axial magnetic poles ring.

Figure 5:
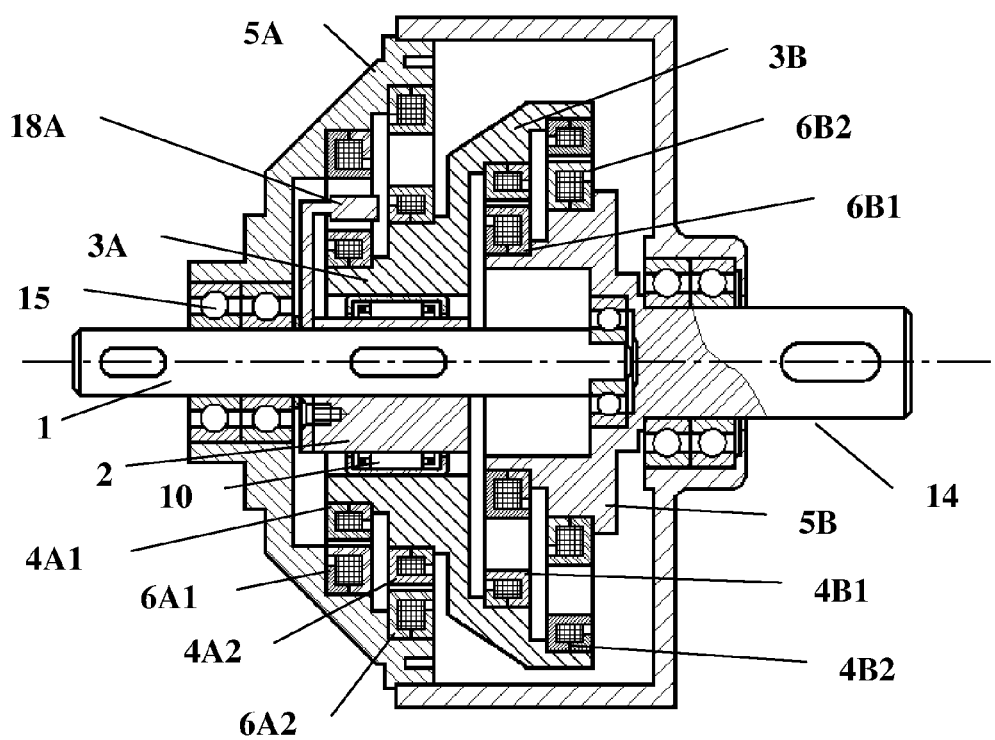
FIG. 5 illustrates a longitudinal section view of a construction possibility for an orbital magnetic speed change mechanism with magnetic poles rings as the model of FIG. 4 and the magnetic poles rings with orbital motion of the second stage are external to their pairs.

In FIG. 5 we have another possibility to construct orbital magnetic speed change using electromagnetic poles rings formed by the axial junction of two multi-poles parts of soft magnetic material (7) and (8) around a coil (12) forming a magnetic poles rings with adjacent alternating magnetic poles magnetized by a coil, similar to the magnetic poles ring model of FIG. 4. In this case to have torque transfer between the lower rotation shaft (14) and the higher rotation shaft (1) is necessary to energize four coils simultaneously been two coils of the pairs of magnetic poles rings (6A1) with (4A1) or (6A2) with (4A2) of the first transmission stage and two coils of the pairs of magnetic poles rings (6B1) with (4B1) or (6B2) with (4B2) of the second transmission stage. So we have two possible transmission ratios in the first stage and two in the second stage, in addition it is possible to alternate the pair of coils to be energized causing intermediary transmissions ratios. In this example, as the magnetic poles rings (4B1) and (4B2) with orbital motion of the second transmission are external to their pairs (6B1) and (6B2) different from the first transmission, it makes possible smaller transmission ratios.

Figure 6:
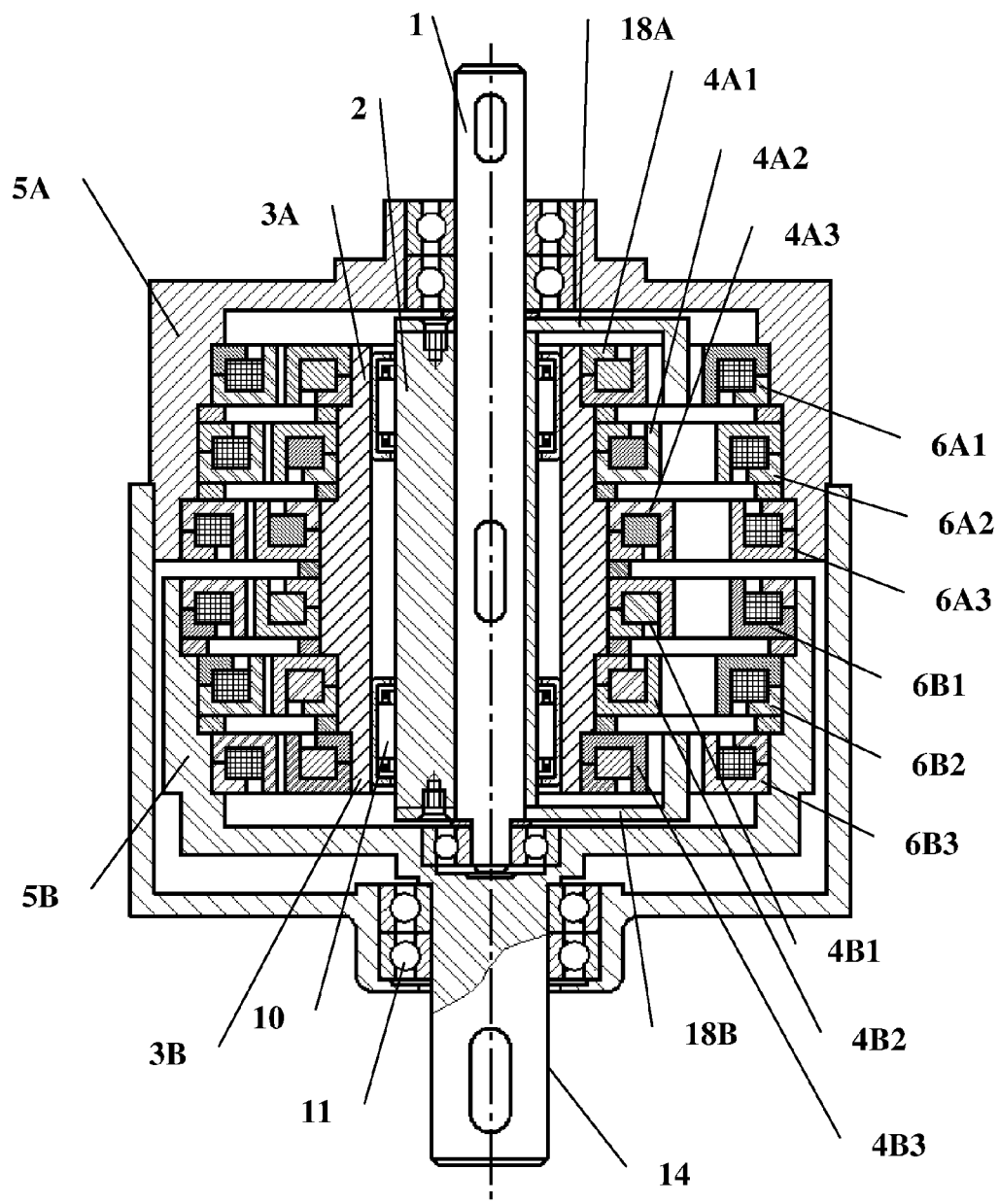
FIG. 6 presents a longitudinal section view of an orbital magnetic speed change with the external magnetic poles rings as the model of FIG. 4 and the magnetic poles rings with orbital motion having its poles magnetized by permanent magnets, having each stage three pairs of magnetic poles rings.

We have shown in FIG. 6 a longitudinal cross section of a orbital magnetic speed change using the magnetic poles rings (6A1), (6A2), (6A3), (6B1), (6B2) and (6B3), consisting of magnetic poles ring magnetized by a coil similar to the model in FIG. 4 and magnetic poles rings (4A1), (4A2), (4A3), (4B1) (4B2) and (4B3), consisting of two parts similar to the multi-polar parts of soft magnetic material (7) and (8), as the model in FIG. 4, but with the poles being external and with these pieces closing around an axial bipolar permanent magnet ring generating a magnetic poles ring with external poles and adjacent poles with alternating polarity. To have power transfer between the shafts (1) and (14) is necessary to energize one of the coils of the magnetic poles rings (6A1), (6A2) or (6A3) of the first stage and one of the coils of the second stage of the magnetic poles rings (6B1), (6B2) or (6B3). This magnetic speed change has nine possible transmission ratios and other transmission ratios are possible if energizing coils of the same stage alternately.

Figure 7A:
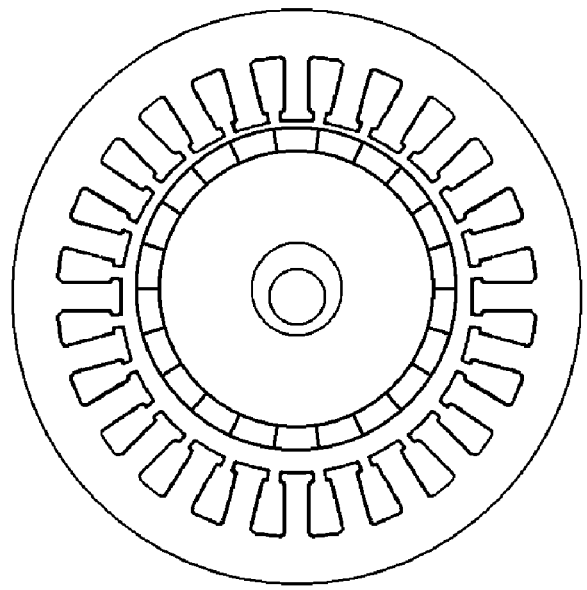
FIG. 7A presents a schematic representation of an external magnetic poles ring formed with stator steel sheets of electric motor and the internal magnetic poles rings with orbital motion formed with permanent magnets.
Figure 7B:
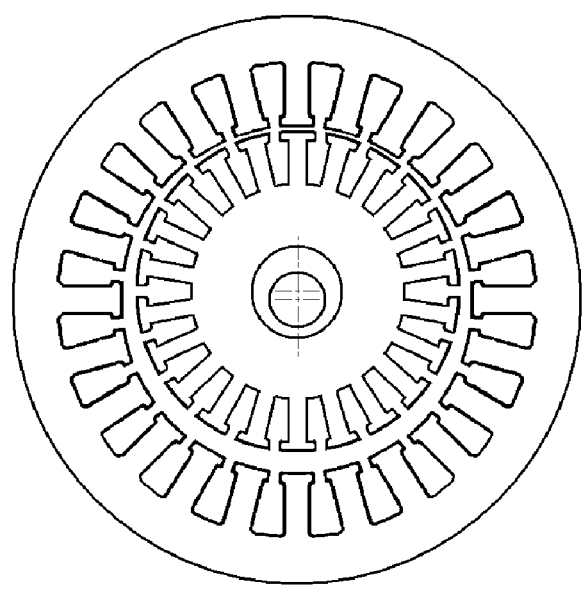
FIG. 7B presents a schematic representation of an external magnetic poles ring formed with stator steel sheet of an electric motor and the internal magnetic poles rings with orbital motion formed with rotor steel sheet of an electrical motor.

FIG. 7A and FIG. 7B have other possible construction for the magnetic poles rings using a core formed with multi-slots stamped steel sheets as used in electric motors and generators, and with the coils arranged in the slots and the coils of each pole energized individually or energized in group with adjacent poles with reverse magnetization. The inner magnetic poles rings can be or formed by permanent magnets as shown in FIG. 7A, or formed with core and coils with the core formed with stamped steel sheets as used in electric motors and generators as in FIG. 7B and the poles magnetized by the energizing of the coils in the slots individually or in group, or formed by magnetic poles rings as in FIG. 4, etc. In this case at least two different pairs of magnetic poles rings are necessary in one transmission stage to have the transmission ratio change, because each pair of magnetic poles rings of one transmission stage define one transmission ratio when its coils are turned on. Turning off the coils of one pair of magnetic poles rings and turning on the coils of another different pair of magnetic poles rings of the same transmission stage changes the transmission ratio. Magnetic poles rings as in FIG. 7B, with the coils magnetized in groups makes possible to have for the same pair of magnetic poles rings, different transmissions ratios for different numbers of coils for each pole, for example, if we had 40 slots in one magnetic poles ring and 80 slots in its respective pair with both magnetic poles rings with one coil in each two adjacent slots and each of the 40 and 80 coils energized individually in both magnetic poles rings, if energizing groups of four adjacent coils in the same direction and the adjacent groups reversely for both magmagnetic poles rings resulting in poles with four coils, we would have 10 alternating poles on the magnetic poles ring of 40 slots and 20 poles in the magnetic poles ring of 80 slots and if energizing groups of five coils we would have 8 alternate poles in the first magnetic poles ring and 16 alternate poles in the other, therefore would be possible to have the transmission ratios for the number of poles 8:16, 8:20, 10:16 and 10:20, generating this pair of magnetic poles rings three different transmission ratios in one transmission stage.

Figure 8A:
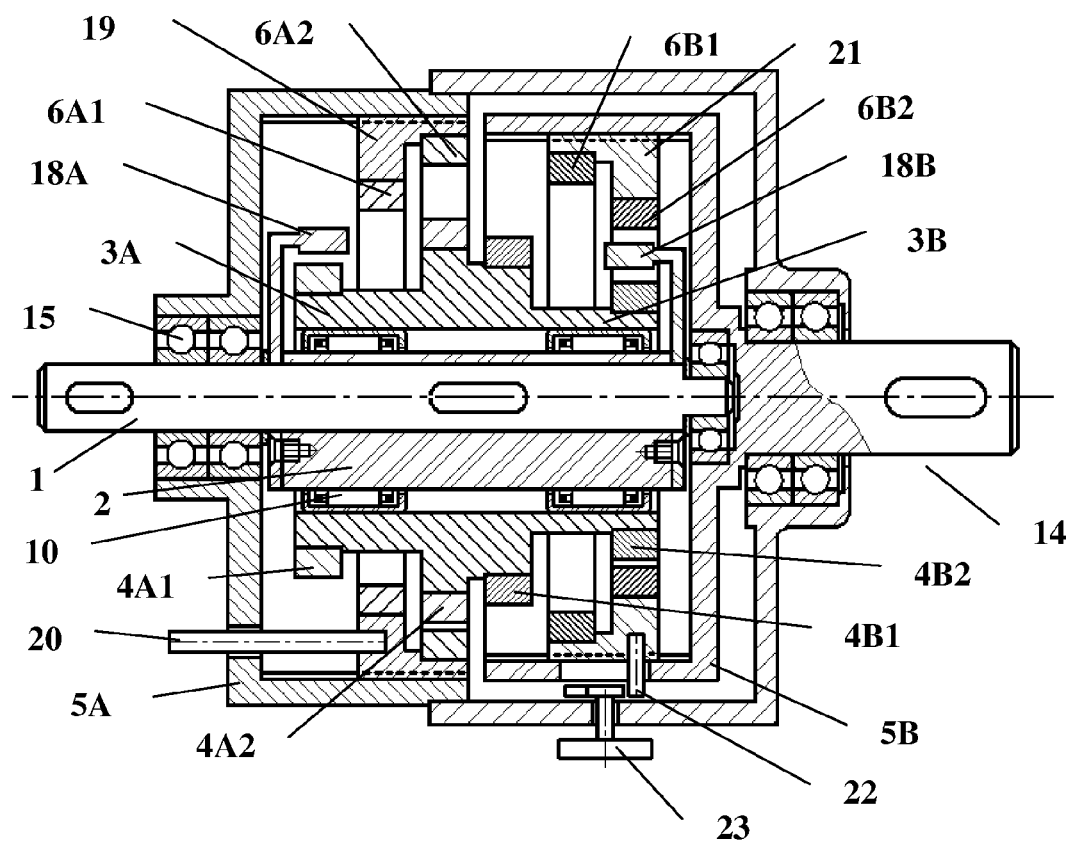
FIG. 8A presents a longitudinal section view of an orbital magnetic speed change with all magnetic poles rings formed by permanent magnets and the two external magnet poles rings of the first and second stages being each set mounted in a support with axial movement in its base.
Figure 8B:
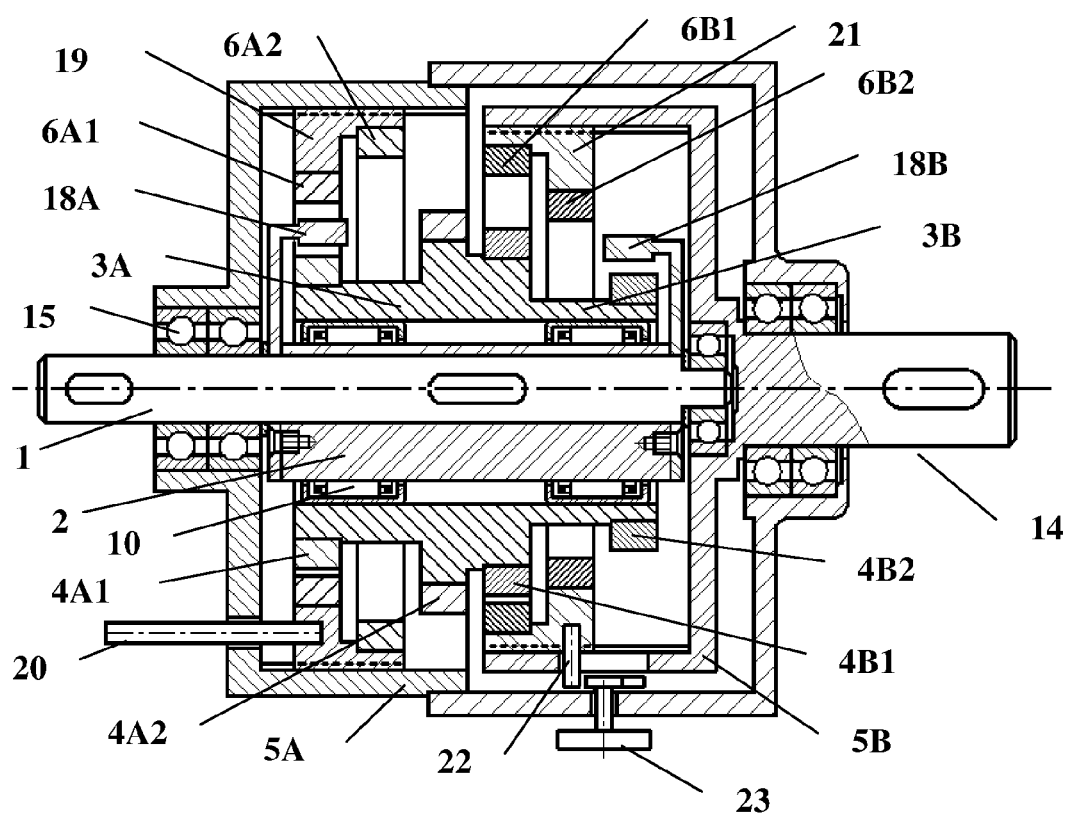
FIG. 8B presents the orbital magnetic speed change of FIG. 8A with the two supports of the magnetic poles rings, displaced axially resulting in other transmission ratio.

In FIG. 8A we have another example of orbital magnetic speed change, and now, the transmission ratio change is done mechanically. The magnetic poles rings (6A1) and (6A2) of the fixed base (5A) are mounted reciprocal to the support (19), which has axial movement coupled in the fixed base (5A). The axial movement of the support (19) is done by axial moving its reciprocal pin (20). The magnetic poles rings (6B1) and (6B2) of the rotational base (5B) are mounted reciprocal to the support (21), which has axial movement coupled in the rotational base (5B). The axial movement of the support (21) is done by axial moving its reciprocal pin (22) and the pin (22) is driven by changing the position of the lever (23). The two positions of support (19) leaving magnetically coupled the magnetic poles rings (4A2) with (6A2) as in FIG. 8A or leaving coupled the magnetic poles rings (4A1) with (6A1) as in FIG. 8B, define the two transmission ratios of the first stage. The two positions of support (21) leaving magnetically coupled the magnetic poles rings (4B2) with (6B2) as in FIG. 8A or coupling the magnetic poles rings (4B1) with (6B1) as in FIG. 8B, define the two transmission ratios of the second stage. In this example are four possible transmission ratios for the magnetic speed change. In this example of FIG. 8A and FIG. 8B the eccentric cam (2) has reciprocal to it the counterweights (18A) and (18B) to minimize the unbalance forces generated by the orbital motion.

Figure 9:
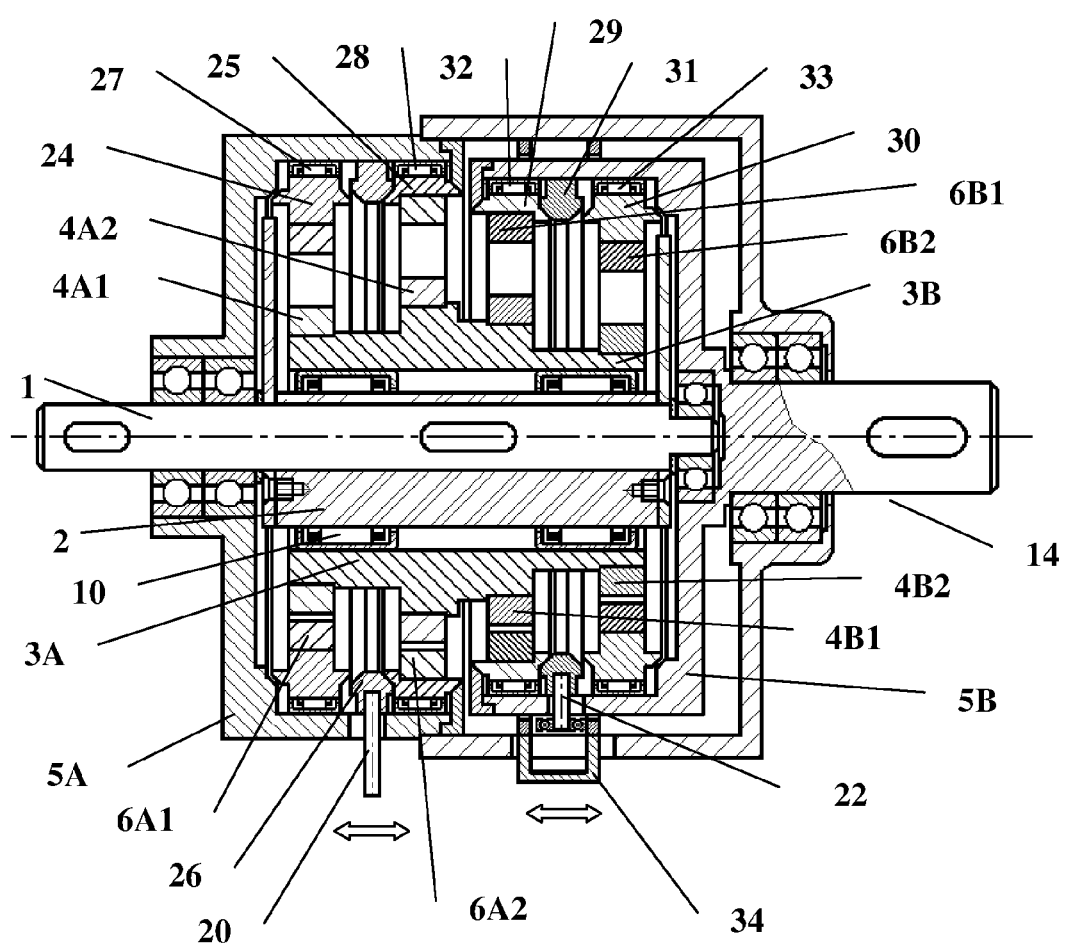
FIG. 9 presents a longitudinal section view of another possibility for the orbital magnetic speed change with all magnetic poles rings formed by permanent magnets and the external magnet poles rings mounted each one in a support that rotates on its base and the axial displacement of the one coupler changes the transmission ratio.

FIG. 9 is another example of orbital magnetic speed change with the transmission ratio change done mechanically. The magnetic poles rings (6A1) and (6A2) of the fixed base (5A) are mounted each one reciprocal to their respective support (24) and (25), which supports rotate in the fixed base (5A) through the respective bearings (27) and (28). The coupler (26) is coupled with the fixed base (5A) and is driven by the axial movement of the pins (20), and the displacement of the coupler (26) to the left causes the coupling between the support (24) and the fixed base (5A) defining a first transmission ratio and its shift to the right causes the coupling between the support (25) and the fixed base (5A) defining a second transmission ratio of the first transmission stage. In the second transmission stage the magnetic poles rings (6B1) and (6B2) of the rotational base (5B) are each of them reciprocal to its respective support (29) and (30), which supports rotate in the rotational base (5B) through the respective bearings (32) and (33). The coupler (31) is coupled to the rotational base (5B) and is driven by the axial movement of the pins (22), which are driven by the handle (34), and the displacement of the coupler (31) to the left causes the coupling between the support (29) and the rotational base (5B) defining a first transmission ratio and its shift to the right causes the coupling between the support (30) and the rotational base (5B) defining a second transmission ratio. As in the previous example are four possible transmission ratios for this orbital magnetic speed change. This form of coupling to change the transmission ratio is simple, serving only to illustrate the operation, as the coupling between the rotating parts is not object of this patent and there are known forms of coupling to change transmission ratios as used in speed change mechanism of automobiles which are more complete and effective.

Figure 10:
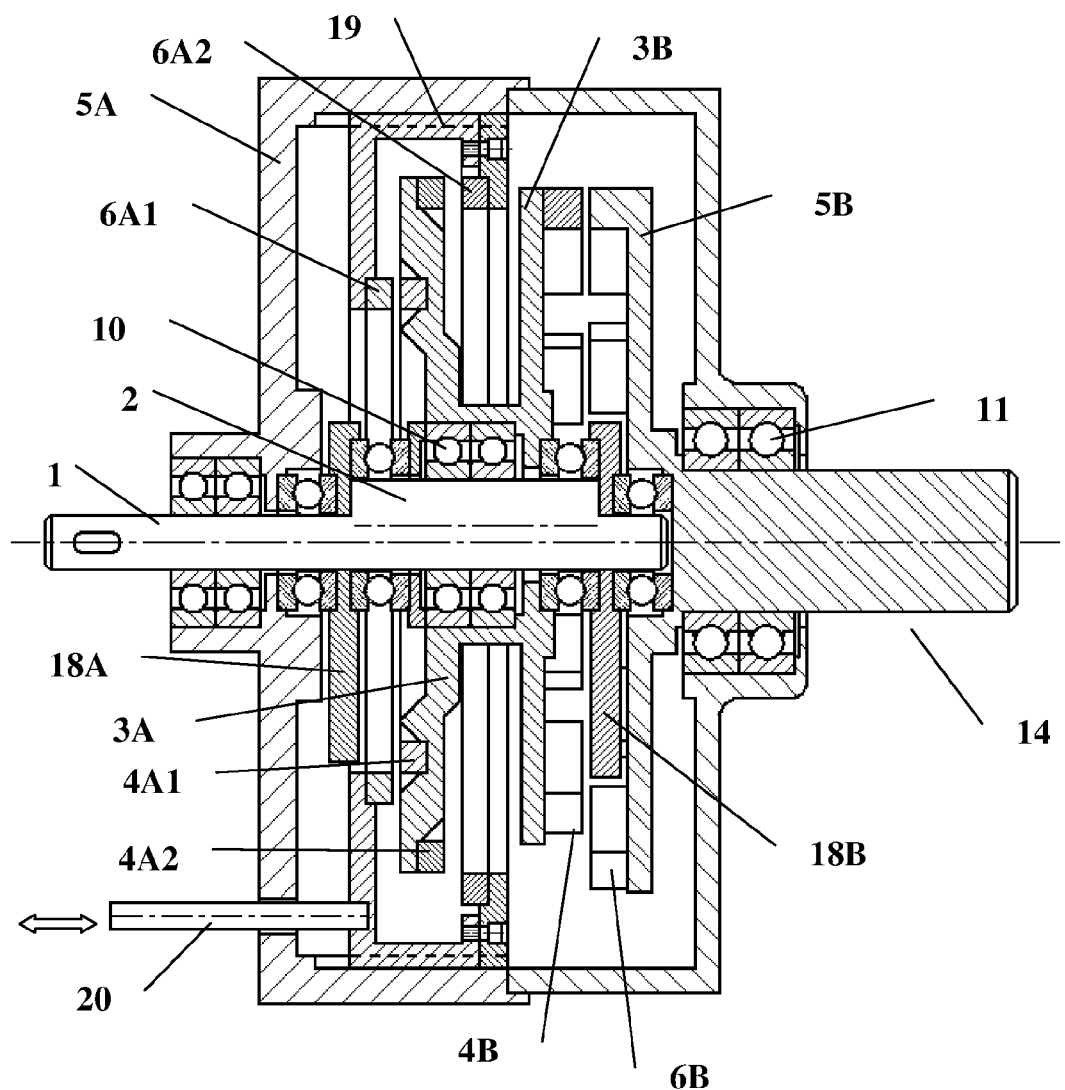
FIG. 10 presents a longitudinal section view of a orbital magnetic speed change with four axial magnetic poles rings in the first transmission, formed by permanent magnets with two magnetic poles rings of the fixed base mounted on a support with axial motion to change the transmission ratio and in the second transmission a magnetic poles rings formed by axial salient poles of permanent magnets coupled to a magnetic poles ring with axial salient poles of soft magnetic material.

In FIG. 10 we have another possibility for the orbital magnetic speed change using in the first transmission stage four axial magnetic poles rings formed by permanent magnets with alternating adjacent poles, with both magnetic poles rings (6A1) and (6A2) of the fixed base (5A) mounted on the support (19) formed of two reciprocal pieces, been one piece reciprocal to the magnetic poles rings (6A1) and the other piece reciprocal to the magnetic poles ring (6A2), having the support (19) axial movement coupled with the fixed base (5A). The axial movement of the support (19) is done by moving its reciprocal pin (20) axially. The two positions of support (19) leaving magnetically coupled the magnetic poles rings (4A2) with (6A2) or coupling the magnetic poles rings (4A1) with (6A1) as in FIG. 10, define the two transmission ratios of the first transmission stage. The transmission of the second stage is done by the magnetic coupling between the magnetic poles ring (4B) formed with axial salient permanent magnets and the magnetic poles ring (6B) formed with salient poles made of soft magnetic material. The eccentric cam (2) has two reciprocal counterweights (18A) and (18B) to balance the eccentric masses. This example of magnetic speed change has only two transmission ratios defined in the first transmission stage.

Depending of the transmission ratio of the orbital magnetic speed change, it can also work as a speed multiplier and in this case, the higher rotation shaft is the output power and the lower rotation shaft is the input power of the magnetic speed change.

Alternate forms of construction not exemplified here are possible, for example, other combinations of magnetic poles rings, other constructions for the magnetic poles rings, other mechanisms to move the permanent magnets and thus change the transmission ratio, moving the magnetic poles rings with orbital motion to change the transmission ratio, etc. but all these possibilities are part of the same principle.

What is claimed is:
1. Orbital magnetic speed change comprising: two transmission stages, a first transmission stage and a second transmission stage,
    a higher rotation shaft (1), which is rotationally supported by a first housing flange,
    an eccentric cam (2) reciprocal to the higher rotation shaft (1), a first orbital base (3A) which supports at least one first magnetic poles ring (4A), the first orbital base (3A) rotates on the eccentric cam (2) and is part of the first transmission stage, a fixed base (5A) that belongs to the first transmission stage, is reciprocal to the first housing flange and supports at least one second magnetic poles ring (6A), which is positioned concentrically with the higher rotation shaft (1), the fixed base (5A) is disposed laterally and in parallel position to the first orbital base (3A) with their respective magnetic poles rings being positioned facing axial or the fixed base (5A) is positioned internally or externally in relation to the first orbital base (3A) with their respective magnetic poles rings being positioned facing radial, and at least one pair of first magnetic poles ring (4A) and second magnetic poles ring (6A) are facing to transmit magnetic torque between the first orbital base (3A) and the fixed base (5A) of the first transmission stage, a lower rotation shaft (14) is rotationally supported in a second housing flange and a second orbital base (3B) that supports at least one third magnetic poles ring (4B), the second orbital base (3B) is part of the second transmission stage and rotates on the eccentric cam (2) and is reciprocal or coupled with the first orbital base (3A), a rotational base (5B) of the second transmission stage supports at least one fourth magnetic poles ring (6B), and is positioned concentric with the higher rotation shaft (1), and the rotational base (5B) is disposed or laterally and in parallel position to the second orbital base (3B) with the respective magnetic poles rings of the rotational base (5B) and the second orbital base (3B) being positioned facing axial or the rotational base (5B) is positioned internally or externally in relation to the second orbital base (3B) with their respective magnetic poles rings being positioned facing radial, the rotational base (5B) is concentric and coupled or reciprocal with the lower rotation shaft (14), at least one pair of magnetic poles rings of the second orbital base (3B) and of the rotational base (5B) are facing to transmit magnetic torque between the second orbital base (3B) and rotational base (5B) of the second transmission stage.

2. The orbital magnetic speed change of claim 1 wherein having in at least one of the transmissions stages, two or more magnetic poles rings of the one of the bases of the same transmission stage reciprocal to a support, each support is coupled in the respective base of its magnetic poles rings and the support has axial movement on its coupled base, the magnetic poles rings of one base are distant from each other on their support in different distance compared with the distance between their respective pairs of magnetic poles rings reciprocal to the other base of the same transmission stage, and the pairs of magnetic poles rings are formed of permanent magnets with adjacent poles with alternating polarity or the magnetic poles rings of one base are formed of salient permanent magnets with the magnetic poles rings of the other base formed of salient poles of soft magnetic material, the transmission ratio change is done by changing the axial position of the support of the magnetic poles rings of at least one of the transmission stages separating a pair of facing magnetic poles ring and bringing near for facing another pair of magnetic poles ring.

3. The orbital magnetic speed change of claim 1 wherein having in at least one of the transmissions stages, two or more magnetic poles rings of the one of the bases of the same transmission stage reciprocal each one to a support, with each of these magnetic poles rings of one base facing its respective pair of magnetic poles ring reciprocal to the other base of the same transmission stage, and the pairs of magnetic poles rings are formed of permanent magnets with alternating adjacent poles or the magnetic poles rings of one base are formed of salient permanent magnets with the magnetic poles rings of the other base formed of salient poles of soft magnetic material, each support is rotationally supported on its respective magnetic poles ring base, a coupler positioned between each two supports of magnetic poles rings of a base is coupled with the base, and having axial movement between both magnetic poles ring supports where the transmission ratio change of one stage is done by changing the axial position of one of its coupler where the axial displacement toward a magnetic poles ring support couples the support and the coupler, and the axial displacement in the opposite direction uncouple the magnetic poles ring support that were coupled and couples the other adjacent magnetic poles ring support.

4. The orbital magnetic speed change of claim 1 wherein having in at least one of the transmissions stages, two or more magnetic poles ring of at least one of the bases of the same transmission stage, reciprocal to their respective base and the magnetic poles rings are formed by electromagnets rings with multiple salient poles and each magnetic poles ring is magnetized by the energizing of its coil, with each magnetic poles ring of one base facing its respective pair of magnetic poles ring of the other base of the same transmission stage, and the respective pair of magnetic poles ring of the other base of the same transmission stage is reciprocal with its base and is formed of salient poles made of a soft magnetic material or formed with a electromagnet ring with multiple salient poles magnetized by the energizing of its coil, the transmission ratio change is done by turning off the coils of the pair of magnetic poles rings of at least one transmission stage energized and turning on the coils of another pair of magnetic poles rings of the same transmission stage.

5. The orbital magnetic speed change of claim 1 wherein having in at least one of the transmissions stages, two or more magnetic poles ring of at least one of the bases of the same transmission stage, reciprocal to their respective base and with the magnetic poles rings formed by the joining of two multi-poles parts of soft magnetic material, a first multi-poles part (7) and a second multi-poles part (8) around a coil (12) forming a magnetic poles ring with adjacent alternating poles magnetized by the energizing of the coil (12), with each magnetic poles ring of one base facing a pair of magnetic poles ring of the other base of the same transmission stage, each respective pair of magnetic poles ring of the other base of the same transmission stage is reciprocal to its base and is also formed by joining two multi-poles parts of soft magnetic material, a first multi-poles part (7) and a second multi-poles part (8) around a coil (12) forming a magnetic poles ring with adjacent alternating poles magnetized by the energizing of its coil (12) or also formed by joining two multi-poles parts of soft magnetic material, a first multi-poles part (7) and a second multi-poles part (8) around a bipolar permanent magnet ring forming a magnetic poles ring with adjacent alternating magnetic poles magnetized by the permanent magnet or formed with permanent magnets with adjacent alternating poles, with the transmission ratio change done by turning off the coils of the pair of magnetic poles ring of at least one transmission stage energized and turning on the coils of another pair of magnetic poles ring of the same transmission stage.

6. The orbital magnetic speed change of the claim 1 wherein having in at least one of the transmissions stages, one or more magnetic poles rings of each base of the same transmission stage reciprocal with the respective base and each magnetic poles ring formed with a core and coils with the core made of multi-slots stamped sheets of soft magnetic material, with the coils arranged in the core slots, and magnetizing each magnetic poles ring by the energizing of the coils, energizing reversely each adjacent groups of coils where each group of coils form one pole, with each magnetic poles ring of one base facing with a respective pair of magnetic poles ring reciprocal to the other base of the same transmission stage, with the transmission ratio change done by turning off the coils of the pair of magnetic poles ring of at least one transmission stage energized and turning on the coils of another pair of magnetic poles ring of the same transmission stage or energizing the same magnetic poles ring or pair of magnetic poles rings with poles formed with different numbers of coils.

7. The orbital magnetic speed change of claim 1 wherein having in at least one of the transmissions stages, two or more magnetic poles rings of at least one base of the same transmission stage reciprocal to the base with the magnetic poles rings formed with a core and coils, with the core made of multi-slots stamped sheets of soft magnetic material, with the coils arranged in the core slots, and each magnetic poles ring magnetized by the energizing of its coils, energizing reversely each adjacent coil or adjacent groups of coils where each group of coils form one pole, with each magnetic poles ring of one base facing a respective pair of magnetic poles ring of the other base of the same transmission stage, each respective pair of magnetic poles ring of the other base is reciprocal to the other base of the same transmission stage, and it is formed with a core and coils with the core made of multi-slots stamped sheets of soft magnetic material, with the coils arranged in the core slots, and each magnetic poles ring magnetized by the energizing of its coils, energizing reversely each adjacent coil or adjacent groups of coils where each group of coils form one pole or it is formed by salient poles of soft magnetic material or it is formed by permanent magnets of alternating adjacent poles or it is formed by joining two multi-poles parts of soft magnetic material, a first multi-poles part (7) and a second multi-poles part (8) around a coil (12) forming a magnetic poles ring with alternating adjacent poles magnetized by the energizing of the coil (12) or also it is formed by joining two multi-poles parts of soft magnetic material, a first multi-poles part (7) and a second multi-poles part (8) around a bipolar permanent magnet ring forming a magnetic poles ring with adjacent alternating poles magnetized by the bipolar permanent magnet, with the transmission ratio change done by turning off the coils of the pair of magnetic poles ring of at least one transmission stage energized and turning on the coils of another pair of magnetic poles ring of the same transmission stage.

* * * * *